United States Patent [19]
Ito et al.

[11] Patent Number: 5,948,149
[45] Date of Patent: Sep. 7, 1999

[54] WATER-BASED INK COMPOSITION

[75] Inventors: Kengo Ito; Hiroyuki Nakashinden, both of Miyagi, Japan

[73] Assignee: Sony Corporation, Tokyo, Japan

[21] Appl. No.: 08/871,379

[22] Filed: Jun. 9, 1997

[30]     Foreign Application Priority Data

Jun. 11, 1996 [JP] Japan ................................. P08-149186
Mar. 26, 1997 [JP] Japan ................................. P09-074192

[51] Int. Cl.⁶ ...................................................... C09D 11/00
[52] U.S. Cl. .................................... 106/31.13; 106/31.27; 106/31.86
[58] Field of Search .............................. 106/31.13, 31.27, 106/31.86

[56]     References Cited

U.S. PATENT DOCUMENTS

| | | | |
|---|---|---|---|
| 4,920,361 | 4/1990 | Arahara et al. | 106/31.13 |
| 4,962,389 | 10/1990 | Kan et al. | 106/31.13 |
| 5,100,468 | 3/1992 | Yuasa et al. | 106/31.86 |
| 5,108,502 | 4/1992 | Pawlowski et al. | 106/31.27 |

*Primary Examiner*—Deborah Jones
*Assistant Examiner*—Veronica Faison
*Attorney, Agent, or Firm*—Hill & Simpson

[57]              ABSTRACT

The present invention provides a water-based ink composition in which the wettability, surface tension, antibacterial properties, and other properties are controlled based on a simple formulation. The water-based ink composition of the present invention contains a semi-polar boron compound. Semi-polar boron compounds represented by diglycerin borate exhibit superior wettability in an ordinary environment, and addition of such a compound achieves a water-based ink composition well-balanced in surface tension, wettability, and drying property even if the composition is prepared according to a simple formulation. The optimum quantitative range for addition of the semi-polar boron compound depends on whether the coloring material contained in the watercolor ink composition is a dyestuff or a pigment. When the coloring material is a dyestuff, the quantitative range is preferably 0.5 to 3.0% by weight relative to the entire quantity of the water-based ink composition. When the coloring material is a pigment, the quantitative range is preferably 0.05 to 10% by weight relative to the same.

7 Claims, No Drawings

WATER-BASED INK COMPOSITION

BACKGROUND OF THE INVENTION

1. Field of the Invention

The present invention relates to water-based ink compositions used for ink-jet printers, stationery, various printing processes, and others.

2. Description of the Related Art

Ink-jet recording is employed as a method for outputting images formed by personal computers or the like onto recording media such as paper or OHP film.

In ink-jet recording, ink droplets are ejected from a nozzle of an ink-jet printer toward a recording medium while using an electrical field, heat, pressure or the like as a driving source, and thus an image is formed on the recording medium.

Such ink-jet recording is advantageous in that it can be performed with low-level noise at a low running cost, images can be formed on plain paper, and no waste such as ink ribbons and toner cartridges is generated. Additionally, if a water-based ink is used, ink-jet recording will be further advantageous since organic solvents evaporating into the air can be dispensed with or reduced. Due to such advantages, in recent years, ink-jet recording apparatuses have rapidly spread for office and personal (family) use.

Incidentally, inks used in, for example, ink-jet printers, require the following properties.

(1) Not to clog the printer head.
(2) To readily penetrate into the recording sheet.
(3) To dry rapidly.
(4) To have superior storage-stability.

These properties depend on the composition of the ink, and the solution physical-properties determined in accordance with the composition.

For example, ink wettability closely concerns the above property (1), surface tension closely concerns the property (2), and drying property closely concerns the property (3), respectively. Satisfactory wettability is necessary for stable ink-ejection from a nozzle of a printer head under any conditions. Surface tension closely relates to the image quality, namely, directional accuracy of ejected ink-droplets, dot formativity, penetrability into recording sheets, generation of satellites, and others.

In order to satisfy the above-described ink properties, a well-balanced selection is required of the solvent and additive in the water-based ink composition. In addition to water, dye-solubilizers are used as solvents. As additives, wetting agents, surfactants, pour point depressants, defoaming agents, antibacterial agents and others are used.

Hitherto, addition of a lower aliphatic monohydric alcohol such as methyl alcohol, ethyl alcohol, n-propyl alcohol, isopropyl alcohol, n-butyl alcohol, s-butyl alcohol, and t-butyl alcohol is employed as a method for adjusting the surface tension of an ink for ink-jet recording to a value appropriate for ink-ejection from a nozzle of a printer head. Water-based inks with the addition of alcohols are also frequently adopted as inks for other uses such as writing tools.

Conventional water-based inks contain such solvents and additives, namely, they are mixtures comprising 10 or more ingredients including water.

Due to this, the ingredients mutually interact to influence the solvent physical-properties, the optimum composition balance cannot be easily determined, and actually, an ink composition which sufficiently satisfies the above-described properties cannot be readily achieved.

Further, bleeding, feathering, and tone irregularity are problems inherent in ink-jet recording on plain paper, which has no specific ink-receiving layer. Particularly, in complex characters and smaller characters, bleeding and feathering become further apparent, and therefore, such characters become unrecognizable.

As a remedy for this, a highly-viscous solvent (resin) is further added to the ink to inhibit migration of the coloring material, and thus, bleeding and feathering are prevented.

However, although bleeding and feathering can be inhibited by making the ink-viscosity high, a considerable amount of a viscous solvent should be added for such inhibition. As a result, the ink-viscosity becomes too high, which causes reduction in speed and amount of the ink ejected from the nozzle.

Further, even if a high ink-viscosity can be achieved, the ink may readily spread on plain paper, and may contrarily cause bleeding and feathering when surface tension is severely reduced.

SUMMARY OF THE INVENTION

The present invention is directed to solving the above-described problems, and an object of the invention is to provide a water-based ink composition in which the wettability, surface tension, antibacterial properties, and other properties are controlled based on a simple formulation.

Further, another object of the present invention is to provide a water-based ink composition which achieves printing without bleeding and feathering even on plain paper.

Additionally, another object of the present invention is to provide a water-based ink composition which can be obtained without addition of a large amount of additive such as a highly-viscous solvent, and can exhibit superior ejection property.

The Inventors conducted research on several additives aiming to control the solution properties such as wettability and surface tension of a water-based ink composition. As a result, the Inventors found that a semi-polar boron compound meets such a purpose, and have accomplished the present invention.

Accordingly, the water-based ink composition of the present invention is characterized by containing a semi-polar boron compound.

Semi-polar boron compounds represented by diglycerin borate exhibit superior wettability in an ordinary environment, and their addition achieves water-based ink compositions well-balanced in surface tension, wettability, and drying property even with simple formulations.

Further, when such a semi-polar boron compound is added as a specific solvent, migration of coloring material on paper can be prevented, and bleeding and feathering inherent in printing on plain paper can be inhibited.

Moreover, since such a compound is effective even in low amounts different from a highly-viscous solvent, it does not affect ejection property.

DESCRIPTION OF THE PREFERRED EMBODIMENT

As described above, the water-based ink composition of the present invention is characterized by containing a semi-polar boron compound.

Semi-polar boron compounds are organic boron compounds having both plus (+) and minus (−) intramolecular polarities. Since boron ordinarily has a coordination number of 3, organic boron compounds having B—O bonds have a plane bond structure with each bond angle of 120°. The above-described boron compound, however, has a tetrahedral structure since the electron donating group is attracted toward the boron atom.

A typical example of such semi-polar boron compound is diglycerin borate which is synthesized with glycerin and boric acid at a mole ratio of 2:1, and is expressed by the following chemical formula (I).

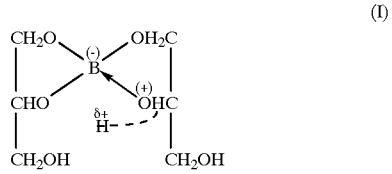

Diglycerin borate can be used in the present invention.

Further, diglycerin borate derivatives can also be used. Diglycerin borate derivatives may be compounds derived by reacting diglycerin borate reacted with fatty acid, as shown in the following reaction formula.

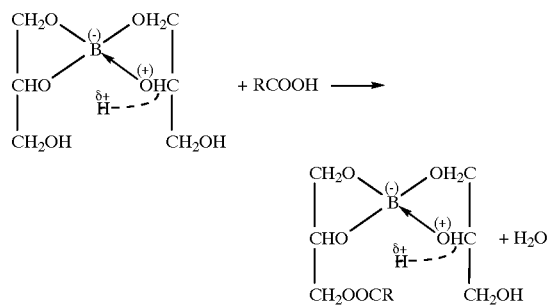

Typical examples of such derivatives include glycerin monolauroylglycerin borate, glycerin monopalmitoylglycerin borate, and glycerin monostearoylglycerin borate.

In addition, a compound derived by complexing diglycerin borate and 1,3-dimethyl-1,2-imidazolidinone can also be used.

Furthermore, in addition to the above-described diglycerin borate and derivatives thereof, compounds such as those expressed by the following chemical formula (II) can also be used.

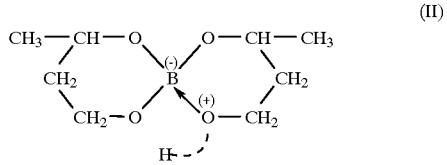

Each above-described semi-polar boron compound, for example, diglycerin borate, exhibits superior wettability in an ordinary environment. Table 1 shows the data concerning wettability of simple diglycerin borate. The data includes results of examination in which 1 g of diglycerin borate was dropped onto a glass plate and left standing in an atmosphere of 50% relative humidity at 25° C., and weight increase by moisture absorption was measured after each predetermined time period.

TABLE 1

| Time | Weight (g) |
|---|---|
| Initial | 1.00 |
| 2 Hours Later | 1.12 |
| 24 Hours Later | 2.15 |
| 48 Hours Later | 2.59 |

At the same time, semi-polar boron compounds also have antibacterial properties. For example, in diglycerin borate, the MIC (minimum inhibitory concentration) against *Staphylococcus aureus* has been measured at 3,200 ($\mu$g/ml) or less according to the standard method proposed by the Japan Society of Chemotherapy.

The optimum quantitative range for addition of the above-described semi-polar boron compounds depends on whether the coloring material contained in the water-based ink composition is a dyestuff or a pigment. When the coloring material is a dyestuff, the quantitative range is preferably 0.5 to 3.0% by weight relative to the entire quantity of the water-based ink composition. When the coloring material is a pigment, the quantitative range is preferably 0.05 to 10% by weight relative to the same.

With the addition of a too small quantity of the boron compound, the desired effect cannot sufficiently be obtained, and bleeding and feathering will occur. On the other hand, with an excessive quantity, the properties of the ink such as color tone may be affected.

Various natural or synthetic dyestuffs including publicly-known water-soluble dyestuffs can be used as dyestuffs serving as coloring material. Typical examples include dyestuffs of nitroso-type, nitro-type, azo-type, stilbene-type, diphenylmethane-type, triarylmethane-type, xanthene-type, acridine-type, quinoline-type, methine-type, polymethine-type, thiazole-type, indamine-type, indophenol-type, azine-type, oxazine-type, thiazine-type, sulfide-type, aminoketone-type, oxyketone-type, anthraquinone-type, indigoid-type, and phthalocyanine-type.

Black pigments can be listed as the pigments, examples of which include carbon blacks such as furnace black, lamp black, acetylene black, and channel black. In particular, the boron compound is markedly effective when applied to a water-based ink composition which contains, as a coloring material, a carbon black compound having acidic groups on its surface.

The content of such coloring material in an ink is preferably 0.5 to 10% by weight, and more preferably, 1 to 5% by weight, and it is determined in accordance with the desired color tone.

The water-based ink composition of the present invention may further contain a water-soluble organic solvent in addition to water as a solvent, coloring material, and the above-described semi-polar boron compound. As a water-soluble organic solvent, at least one compound selected from aliphatic monohydric alcohols, polyhydric alcohols, or cyclic ketones can preferably be used.

Preferred examples of aliphatic monohydric alcohols are ethyl alcohol, isopropyl alcohol, n-propyl alcohol, and others.

As to polyhydric alcohols, glycols such as ethylene glycol, diethylene glycol, triethylene glycol, tetraethylene glycol, propylene glycol, dipropylene glycol, hexylene glycol, polyethylene glycol, and polypropylene glycol; and derivatives thereof are preferred in view of prevention of head-clogging or ink-freezing.

As to cyclic ketones, 2-pyrrolidone, N-methyl-2-pyrrolidone, γ-butylolactone, propylene carbonate, and others are preferred since they can enhance penetration of the ink into the recording medium.

The content of the water-soluble organic solvent is preferably 1 to 40% by weight, and more preferably, 5 to 20% by weight.

Furthermore, the water-based ink composition of the present invention may contain at least one agent selected from surfactants, viscosity-controlling agents, defoaming agents, antiseptics, or pH-modifiers.

Examples of surfactants include anionic surfactants such as alkylsulfuric esters; and nonionic surfactants such as polyoxyethylene alkyl ethers and polyoxyethylene fatty acid esters. Such surfactants have effects of controlling the surface tension of the ink and improving the storage-stability of the ink. The surface tension of the ink should preferably fall within a range of 25 to 70 dyne/cm, and more preferably, 30 to 50 dyne/cm. Accordingly, the amount of the surfactant is preferably adjusted such that the surface tension falls within such a range.

The viscosity-controlling agent is not especially limited so long as it has an effect of enhancing ejection stability of ink-droplets. For example, water-soluble resins such as polyvinyl alcohol, polyvinyl pyrrolidone, and polyethylene glycol can be listed as viscosity-increasing agents. The ink viscosity is preferably adjusted within a range of 1 to 30 cps, and more preferably, 1 to 15 cps, by controlling the amount of the viscosity-controlling agent.

As to defoaming agents, any ordinary defoaming agent which has an effect of inhibiting generation of bubbles in the ink and enhancing ejection stability of the ink can be used, and typical examples are aliphatic monohydric alcohols. The content of defoaming agents in the ink is preferably 0.5 to 20% by weight, and more preferably, 1 to 10% by weight.

As antiseptics, compounds which have effects of preventing decomposition of the ink and enhancing storage-stability of the ink can be used, and typical examples include sodium dehydroacetate, sodium sorbate, sodium benzoate, and sodium pentachlorophenol. The content of antiseptics in the ink is preferably 0.01 to 5% by weight, and more preferably, 0.1 to 2% by weight.

As to pH-modifiers, any ordinary pH-modifier can be used so long as it can protect the recording apparatus by preventing harmful influence on materials in portions coming into contact with the ink, or has an effect of enhancing storage-stability of the ink. The pH of the ink composition should preferably be adjusted to 7 to 10 by adding such pH-modifiers. Typical examples of such pH-modifiers include ammonia; various organic amines such as monoethanol amine and diethanol amine; inorganic alkali compounds, for example, hydroxide compounds of alkali metals such as sodium hydroxide and lithium hydroxide; organic acids; and mineral acids.

EXAMPLES

Examples to which the present invention was practically applied are illustrated in detail below based on the results of several experiments.

Initially, the optimum content of the semi-polar boron compound was examined in a case where diglycerin borate was used as the boron compound and a dyestuff was used as a coloring material.

Preparation of Water-based Ink Composition

Water-based ink compositions A0 to A6 were obtained by mixing, for 100 g of each composition, 10 g of diethylene glycol monomethyl ether, 3 g of a water-soluble dyestuff (C. I. Direct Blue-199 manufactured by Daiwa Dyestuff Mfg. Co., Ltd.; the trade name is C-319H; and the structure is shown in the following chemical formula), diglycerin borate in an amount within 0 to 5.0, and the balance being water.

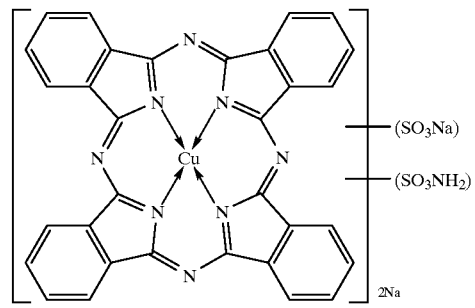

The formulation of each water-based ink composition is shown in FIG. 2.

TABLE 2

|    | Water (g) | Diethylene Glycol Monomethyl Ether (g) | Diglycerin Borate (g) | Dyestuff (g) |
|----|-----------|----------------------------------------|-----------------------|--------------|
| A0 | 87.0      | 10.0                                   | 0                     | 3.0          |
| A1 | 86.7      | 10.0                                   | 0.3                   | 3.0          |
| A2 | 86.5      | 10.0                                   | 0.5                   | 3.0          |
| A3 | 86.0      | 10.0                                   | 1.0                   | 3.0          |
| A4 | 85.0      | 10.0                                   | 2.0                   | 3.0          |
| A5 | 84.0      | 10.0                                   | 3.0                   | 3.0          |
| A6 | 82.0      | 10.0                                   | 5.0                   | 3.0          |

The thus-prepared seven water-based ink compositions A0 to A6 were subjected to evaluation of viscosity, surface tension, wettability, and drying property.

Viscosity

The viscosities of the above seven water-based ink compositions A0 to A6 were measured using a micro-viscometer (manufactured by Eiko Seiki Co., Ltd.).

This viscometer is a falling-ball viscometer, and viscosity η is calculated from the following equation.

$$\eta = K \cdot (\rho 1 - \rho 2) \cdot t$$

η: kinematic viscosity

K: constant (mpa.s.cm/g.s)

ρ1: specific gravity of the ball = approximately 7.8 (g/cm)

ρ2: specific gravity of the test sample (g/cm)

t: time period for ball-dropping

Surface Tension

The surface tensions of the above seven water-based ink compositions A0 to A6 were measured using a CBVP-type tensiometer (Model A3 manufactured by Kyowa Kaimen Kagaku Co., Ltd.).

This tensiometer is based on a ring plate method, and surface tension γ is calculated from the following equation.

$$\gamma = (P/L) \cdot F$$

γ: surface tension

P: force for drawing apart the plate

L: effective circumference length of the plate

F: correction factor

Wettability

The water-based ink compositions A0 to A6 were dropped onto glass plates, 10 drops each, and left standing in an atmosphere of 50% relative humidity at 25° C. for 1 week. After this, the compositions were visually examined for whether or not dyestuff crystals had precipitated. The evaluation "none" means the ink composition has satisfactory wettability while the evaluation "occurred" means precipitation of dyestuff crystals occurred in the composition due to deterioration in wettability.

Drying Property

Each of the water-based ink compositions A0 to A6 was subjected to character printing using a commercially-available ink-jet printer (trade name HP Desk-Jet 1200C manufactured by Hewlett-Packard, Ltd) on a specific recording paper sheet. Thirty seconds after the printing, the printed characters were rubbed with the same specific recording paper sheet, and whether or not ink-tailing, namely, blotting of the recording sheet, had occurred was examined. The evaluation "none" means the ink composition is satisfactory while the evaluation "occurred" means blotting of the recording sheet occurred.

The results of the above tests are shown in Table 3.

TABLE 3

| | Viscosity (cps) | Surface Tension (dyne/cm) | Wettability (Precipitation of Dyestuff Crystals) | Drying Property (Blotting of Recording Sheet) |
|---|---|---|---|---|
| A0 | 1.16 | 59.8 | Occurred | None |
| A1 | 1.17 | 59.6 | Slightly Occurred | None |
| A2 | 1.17 | 59.4 | None | None |
| A3 | 1.18 | 59.2 | None | None |
| A4 | 1.16 | 56.3 | None | None |
| A5 | 1.16 | 54.5 | None | None |
| A6 | 1.16 | 52.0 | None | Slightly Occurred |

As is obvious from Tables 2 and 3, the addition of diglycerin borate reduced the surface tension in accordance with its quantity without affecting the viscosity of the water-based ink composition, and therefore, improvements can be achieved in penetration of the ink composition into recording sheets, or in ejection performance of ink-droplets.

As to wettability, satisfactory results could be obtained in each case with the addition of 0.5% by weight or more, and such cases were free from the danger of clogging the ink-jet nozzle.

Meanwhile, as to drying property, satisfactory results could be obtained in each case with the addition of 3.0% by weight or less, and such cases were free from the danger of blotting by rubbing the printed characters.

Generally evaluating the above results, the addition of diglycerin borate as a semi-polar boron compound in an amount of 0.5 to 3.0% by weight can restrict surface tension to an appropriate value, and achieve a water-based ink composition well-balanced in wettability and drying property. Further, antibacterial properties can also be provided.

Next, the effects due to addition of semi-polar boron compounds other than diglycerin borate were examined.

Water-based Ink Composition A7

A water-based ink composition was prepared in the same formulation as in the water-based ink composition A3 except that the compound expressed by the above-described chemical formula (II) was used as a semi-polar boron compound.

This water-based ink composition A7 was also subjected to the same tests, and the results were 1.17 cps in viscosity, 57.9 dyne/cm in surface tension, the evaluation "none" in relation to wettability, and the evaluation "none" in relation to drying property. Accordingly, the compound of the chemical formula (II) was found to exhibit the same effects as diglycerin borate, and to achieve a water-based ink composition well-balanced in wettability and drying property.

Next, the effect derived by adding a semi-polar boron compound was examined in cases of using a carbon black as a coloring material.

Water-based Ink Composition B1

The following components were mixed while applying ultrasonic waves, and further, filtrated through a disposable membrane filter having a pore size of 0.8 μm to obtain a water-based ink composition B1.

Carbon Black (trade name MICRJET BLACK CW-1 manufactured by Orient Chemical Industries Co., Ltd.) 15.00% by weight Diglycerin Borate (manufactured by Boron International Co., Ltd.) 0.05% by weight 2-Pyrrolidone 18.00% by weight Surfactant (trade name LB-120 manufactured by Boron International Co., Ltd.) 0.03% by weight Dispersant (trade name D-1038 manufactured by Toyo-Petrolite Co., Ltd.) 0.15% by weight Ion-Exchanged Water 66.77% by weight Water-based Ink Composition B2

The following components were mixed while applying ultrasonic waves, and further, filtrated through a disposable membrane filter having a pore size of 0.8 μm to obtain a water-based ink composition B2.

Carbon Black (the same as in the water-based ink composition B1) 15.00% by weight Diglycerin Borate (manufactured by Boron International Co., Ltd.) 10.00% by weight 2-Pyrrolidone 18.00% by weight Surfactant (trade name LB-120 manufactured by Boron International Co., Ltd.) 0.03% by weight Dispersant (trade name D-1038 manufactured by Toyo-Petrolite Co., Ltd.) 0.15% by weight Ion-Exchanged Water 56.82% by weight Water-based Ink Composition B3

The following components were mixed while applying ultrasonic waves, and further, filtrated through a disposable membrane filter having a pore size of 0.8 μm to obtain a water-based ink composition B3.

Carbon Black (the same as in the water-based ink composition B1) 15.00% by weight Diglycerin Borate (manufactured by Boron International Co., Ltd.) 0.05% by weight Propylene Glycol 18.00% by weight Surfactant (trade name LB-120 manufactured by Boron International Co., Ltd.) 0.03% by weight Dispersant (trade name D-1038 manufactured by Toyo-Petrolite Co., Ltd.) 0.15% by weight Ion-Exchanged Water 66.77% by weight Water-based Ink Composition 4

The following components were mixed while applying ultrasonic waves, and further, filtrated through a disposable membrane filter having a pore size of 0.8 μm to obtain a water-based ink composition 4.

Carbon Black (the same as in the water-based ink composition B1) 15.00% by weight Diglycerin Borate (manufactured by Boron International Co., Ltd.) 0.03% by weight Propylene Glycol 18.00% by weight Surfactant (trade name LB-120 manufactured by Boron International Co., Ltd.) 0.03% by weight Dispersant (trade name D-1038 manufactured by Toyo-Petrolite Co., Ltd.) 0.15% by weight Ion-Exchanged Water 66.79% by weight Water-based Ink Composition B0

The following components were mixed while applying ultrasonic waves, and further, filtrated through a disposable membrane filter having a pore size of 0.8 μm to obtain a water-based ink composition B0.

Carbon Black (the same as in the water-based ink composition B1) 15.00% by weight 2-Pyrrolidone 18.00% by weight Surfactant (trade name LB-120 manufactured by Boron International Co., Ltd.) 0.03% by weight Dispersant (trade name D-1038 manufactured by Toyo-Petrolite Co., Ltd.) 0.15% by weight Ion-Exchanged Water 66.82% by weight

[Ejection Performance of Ink]

The above-obtained water-based ink compositions B0 to B4 were subjected to viscosity measurement at 25° C. using a vibration viscometer (trade name CJV-5000 manufactured by Chichibu-Onoda Co., Ltd.). Additionally, their surface tensions were measured using a CBVP-type tensiometer (trade name Model A-3 manufactured by Kyowa Kaimen Kagaku Co., Ltd.). The results are shown in Table 4.

Further, using a bubble-jet-type printer (trade name Color Ink Jet Printer XJ-500 manufactured by Fujitsu Ltd.), a cleaning pattern installed in the printer was printed on recycled paper while the above-obtained water-based ink compositions B0 to B4 were respectively interchanged and used.

The printed images were visually inspected, and evaluated in view of whether or not the ink was stably ejected. The results are also shown in Table 4. Incidentally, in Table 4, the evaluation "○" means that the ink was stably ejected without dot defection and satellites, while the evaluation "X" means that the ink was unstably ejected with dot defection and satellites.

[Bleeding and Feathering]

The above-obtained water-based ink compositions B0 to B4 were subjected to printing on recycled paper using the same bubble-jet-type printer. The printed images were 4 Chinese characters each having a size of 1 mm square, and were examined for whether or not bleeding or feathering had occurred by visually observing the enlarged photographs. The results are shown in Table 4. Incidentally, in Table 4, the evaluation "○" means that none or almost no bleeding and feathering were observed, while the evaluation "X" means that bleeding or feathering was observed.

TABLE 4

|    | Viscosity (m · P · as) | Surface Tension (dyne/cm) | Ejection Performance | Bleeding | Feathering |
|----|------------------------|---------------------------|----------------------|----------|------------|
| B1 | 3.15 | 40.2 | ○ | ○ | ○ |
| B2 | 5.56 | 39.6 | ○ | ○ | ○ |
| B3 | 3.29 | 39.8 | ○ | ○ | ○ |
| B0 | 2.99 | 41.1 | ○ | X | X |
| B4 | 3.10 | 40.1 | ○ | X | X |

As is obvious from Table 4, bleeding and feathering were observed in the images printed with the water-based ink compositions B0 and B4. Accordingly, it was found that the addition of 0.05% by weight or more of diglycerin borate can inhibit bleeding and feathering, and additionally, bleeding and feathering are further inhibited in proportion to the quantity of diglycerin borate added to the ink composition.

Examination on Quantity of Diglycerin Borate

In the above experiments, it was found that bleeding and feathering can be further reduced with a higher quantity of diglycerin borate. Then, another experiment was conducted using an increased quantity of diglycerin borate.

The following components were mixed while applying ultrasonic waves, and further, filtrated through a disposable membrane filter having a pore size of 0.8 μm to obtain a water-based ink composition B5.

Carbon Black (the same as in the water-based ink composition B1) 15.00% by weight Diglycerin Borate (manufactured by Boron International Co., Ltd.) 15.00% by weight 2-Pyrrolidone 18.00% by weight Surfactant (trade name LB-120 manufactured by Boron International Co., Ltd.) 0.03% by weight Dispersant (trade name D-1038 manufactured by Toyo-Petrolite Co., Ltd.) 0.15% by weight Ion-Exchanged Water 51.82% by weight This ink composition was subjected to the same measurements as above, and the results were 20.2 m.P.as in viscosity, 39.3 dyne/cm in surface tension, and unsatisfactory in ejection performance.

It is, therefore, concluded that the addition of diglycerin borate up to 10% by weight can achieve a viscosity and a surface tension not affecting ink-ejection, while the addition above 15% by weight result in a viscosity harmfully affecting ink-ejection.

Examination of Carbon Black used as Coloring Material

An experiment was conducted in which a carbon black without chemical treatment such as for providing surface acidic groups was used.

<Preparation of Carbon Black Dispersion>

The following components:

Carbon Black (trade name PRINTEX 25 manufactured by Degussa Co., Ltd.) 10.00% by weight Ion-Exchanged Water 90.00% by weight were mixed and subjected to dispersing treatment under the below-described conditions.

Dispersing Machine: sand grinder manufactured by Asada Tekko Co., Ltd.

Grinding Medium: glass beads (1 mm diameter)

Packing Density of Grinding Medium: 60%

Grinding Time Period: 3 hours

Further, coarse particles were removed by centrifugation at 5,000 rpm for 10 min., and thus a dispersion solution was obtained.

<Preparation of Pigment Ink>

The following components were mixed while applying ultrasonic waves, and further, filtrated through a disposable membrane filter having a pore size of 0.8 μm to obtain a water-based ink composition B6.

Above-Obtained Dispersion 15.00% by weight

Diglycerin Borate (manufactured by Boron International Co., Ltd.) 0.05% by weight 2-Pyrrolidone 18.00% by weight Surfactant (trade name LB-120 manufactured by Boron International Co., Ltd.) 0.03% by weight Dispersant (trade name D-1038 manufactured by Toyo-Petrolite Co., Ltd.) 0.15% by weight Ion-Exchanged Water 66.77% by weight The above-obtained ink composition had gelled at the time of completion of preparation, and could not be ejected. As is obvious from this result, an ink capable of being stably ejected can be obtained by using a carbon black which has been provided with surface acidic groups by chemical treatment.

As described above, the water-based ink composition of the present invention contains a semi-polar boron compound represented by diglycerin borate. Due to the effect of the compound, the ink composition based on a simple formulation can be satisfactory simultaneously in various properties such as surface tension, wettability, drying property, and antibacterial activity. Accordingly, for example, quality of print images according to ink-jet recording can be improved.

Further, the use of the water-based ink composition according to the present invention can prevent bleeding and feathering, and can achieve excellent printed images.

Moreover, the water-based ink composition of the present invention is free from adding a large amount of a highly-viscous solvent or the like, and therefore, the ejection performance is also satisfactory.

What is claimed is:

1. A water-based ink composition comprising a diglycerin borate expressed by the following chemical formula (I) or a derivative thereof

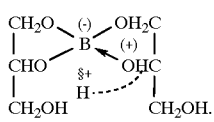
(I)

2. A water-based ink composition comprising a diglycerin borate expressed by the following chemical formula (II) or a derivative thereof

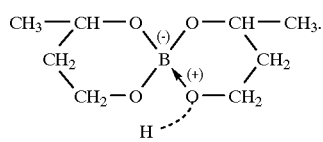
(II)

3. A water-based ink composition comprising: a diglycerin borate compound selected from the group consisting of:

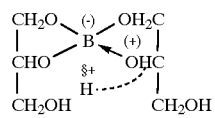
(I)

or a derivative thereof and

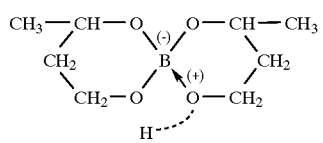
(II)

or a derivative thereof.

4. The water-based ink composition according to claim 3, wherein said water-based ink composition further includes at least one glycol derivative or at least one cyclic ketone derivative.

5. The water-based ink composition according to claim 3, wherein said water-based ink composition further comprises a dyestuff as a coloring material, and the content of said diglycerin borate compound is 0.5 to 3.0% by weight based on the total weight of said ink composition.

6. The water-based ink composition according to claim 3, wherein said water-based ink composition further comprises pigment as a coloring material, and the content of said diglycerin borate compound is 0.05 to 10% by weight based on the total weight of said ink composition.

7. The water-based ink composition according to claim 6, wherein said pigment is a carbon black having acidic groups on its surface.

* * * * *